Jan. 2, 1945. H. NUTT 2,366,643
FRICTION CLUTCH
Filed March 30, 1942 3 Sheets-Sheet 1

Inventor:
Harold Nutt
By Edward P. Gritzbaugh
Atty.

Jan. 2, 1945.   H. NUTT   2,366,643
FRICTION CLUTCH
Filed March 30, 1942   3 Sheets-Sheet 2
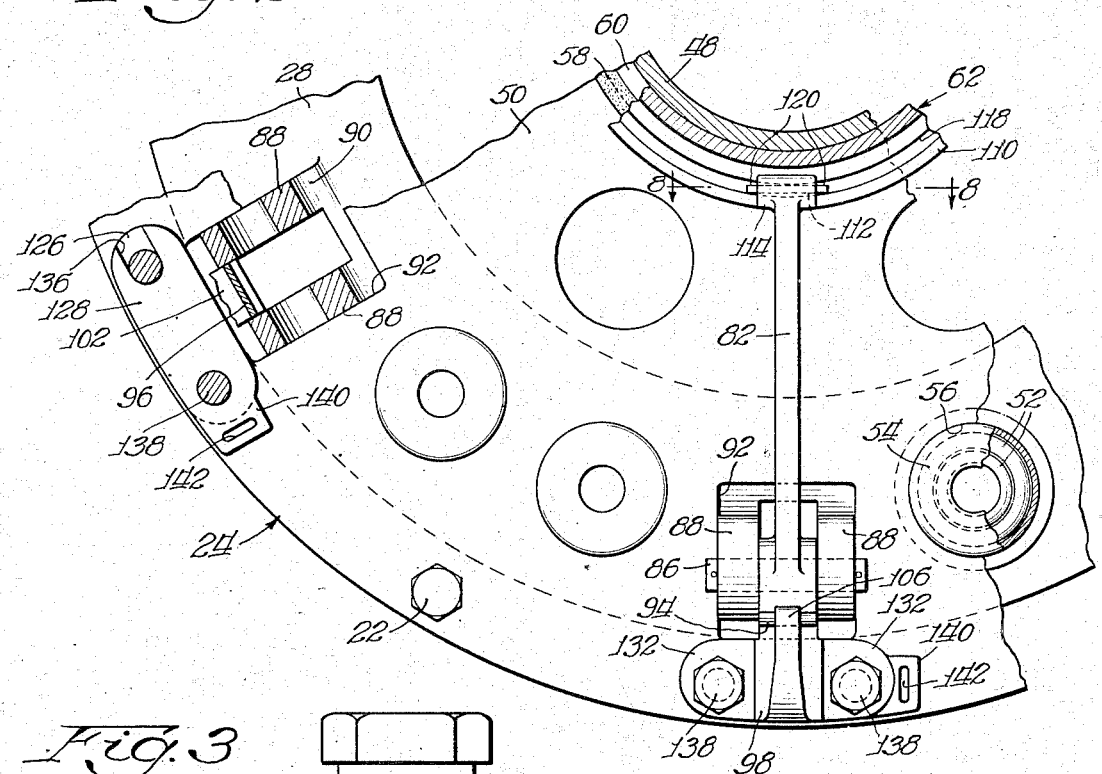
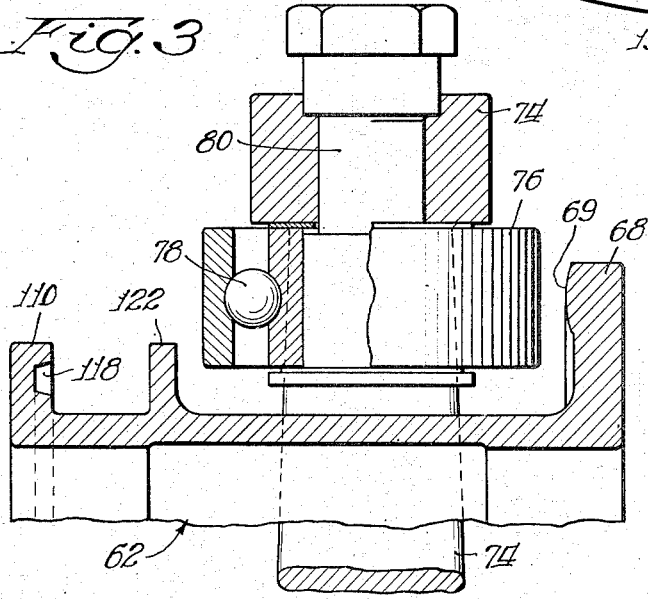
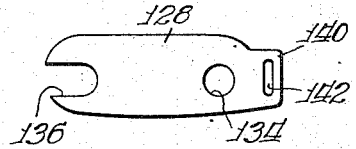
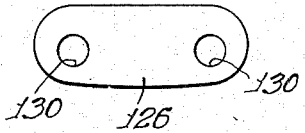
Inventor:
Harold Nutt
By: Edward C. Gritzbaugh
Atty.

Jan. 2, 1945. H. NUTT 2,366,643
FRICTION CLUTCH
Filed March 30, 1942 3 Sheets-Sheet 3
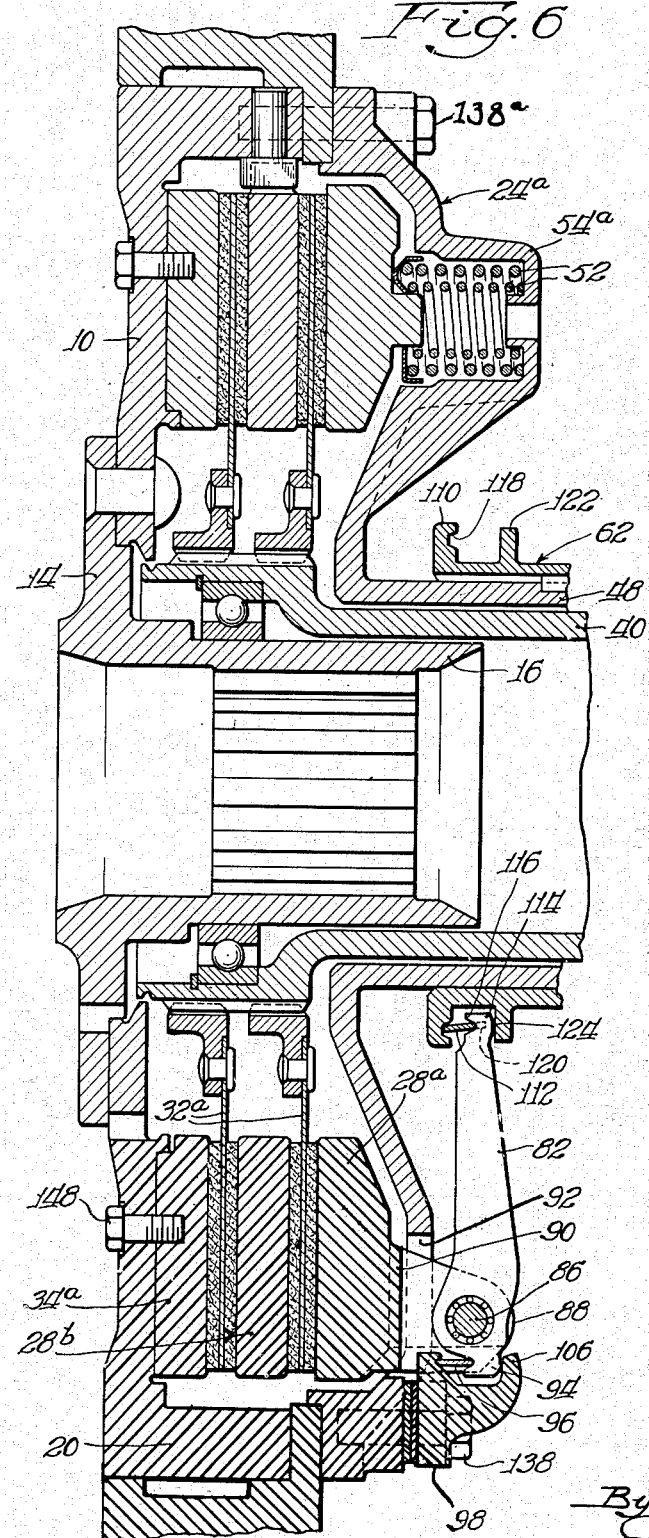
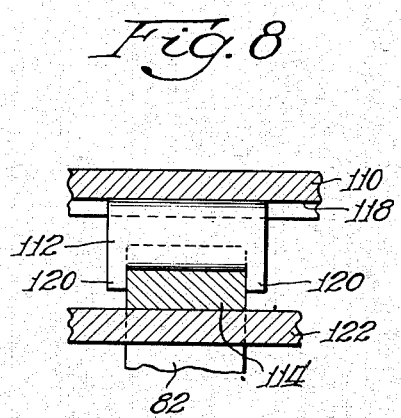
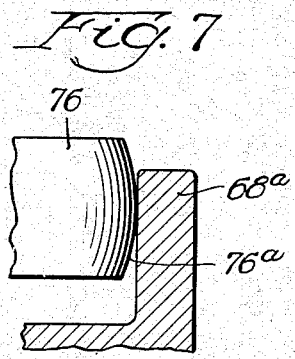
Inventor:
Harold Nutt
By: Edward C. Gritzbaugh
Atty.

Patented Jan. 2, 1945

2,366,643

UNITED STATES PATENT OFFICE 2,366,643

FRICTION CLUTCH

Harold Nutt, Chicago, Ill., assignor to Borg-Warner Corporation, Chicago, Ill., a corporation of Illinois Application March 30, 1942, Serial No. 436,853

20 Claims. (Cl. 192—68)

This invention relates to friction clutches and has as its general object to provide an improved heavy duty clutch suitable for use in military tank transmissions and the like.

Specifically, the invention aims to improve upon an arsenal clutch of a type adapted for use with an engine having a capacity of about 840 foot pounds torque, wherein clutch disengaging pressure is applied from a pair of rollers carried by an operating lever, to a radial flange of a clutch operating collar which is splined upon a sleeve at the center of the clutch cover. In such a clutch organization, the operating collar rotates with the clutch, and there is relative rotation between the collar and the operating lever, but none between the collar and the several release levers which transmit the pressure from the release collar to the pressure plate.

One of the specific objects of the invention is to eliminate wiping contact between the operating lever rollers and the operating collar flange, so as to reduce wearing of the roller and flange to a minimum. In this connection, the invention aims to provide a clutch capable of carrying a load of 1250 foot pounds torque, in which the load upon the operating collar may safely exceed 650 pounds. Under such heavy loads, the problem of wear between the operating lever and the operating collar is a major one.

Another object of the invention is to provide an improved anti-friction connection between the operating collar and the clutch levers. A further object of the invention is to provide an improved arrangement for restraining undesired movement of the clutch levers without interfering in any way with the free operation of the levers.

Another object of the invention is to provide an improved arrangement whereby the clutch levers may be initially adjusted to a parallel setting and may, after a period of wear on the driven member of the clutch, be readjusted so as to compensate for the wear, without disturbing the parallelism of the original adjustment.

Another object of the invention is to provide an improved clutch cover of extremely heavy material and yet having adequate strength to withstand the bursting pressure of centrifugal force. Specifically, the invention aims in this respect to avoid the use of cast iron, which is relatively low in tensile strength.

Other objects, advantages and uses of the invention will become more apparent after reading the following specification and claims, and after consideration of the drawings forming a part of the specification, wherein:

Fig. 2 is a transverse sectional view of a portion of the same, taken on the line 2—2 of Fig. 1;

Fig. 3 is a detailed sectional view of associated portions of the operating lever and operating collar, taken on the line 3—3 of Fig. 1;

Fig. 4 is a detailed view of the wear-in shim;

Fig. 5 is a detailed view of the initial adjustment shim;

Fig. 6 is an axial sectional view of a two plate clutch embodying the invention;

Fig. 7 is a detailed sectional view of a modified arrangement of operating lever and operating collar; and Fig. 8 is a detailed sectional view of a portion of the clutch of Fig. 1, taken on the line 8—8 of Fig. 2.

Figure 1:
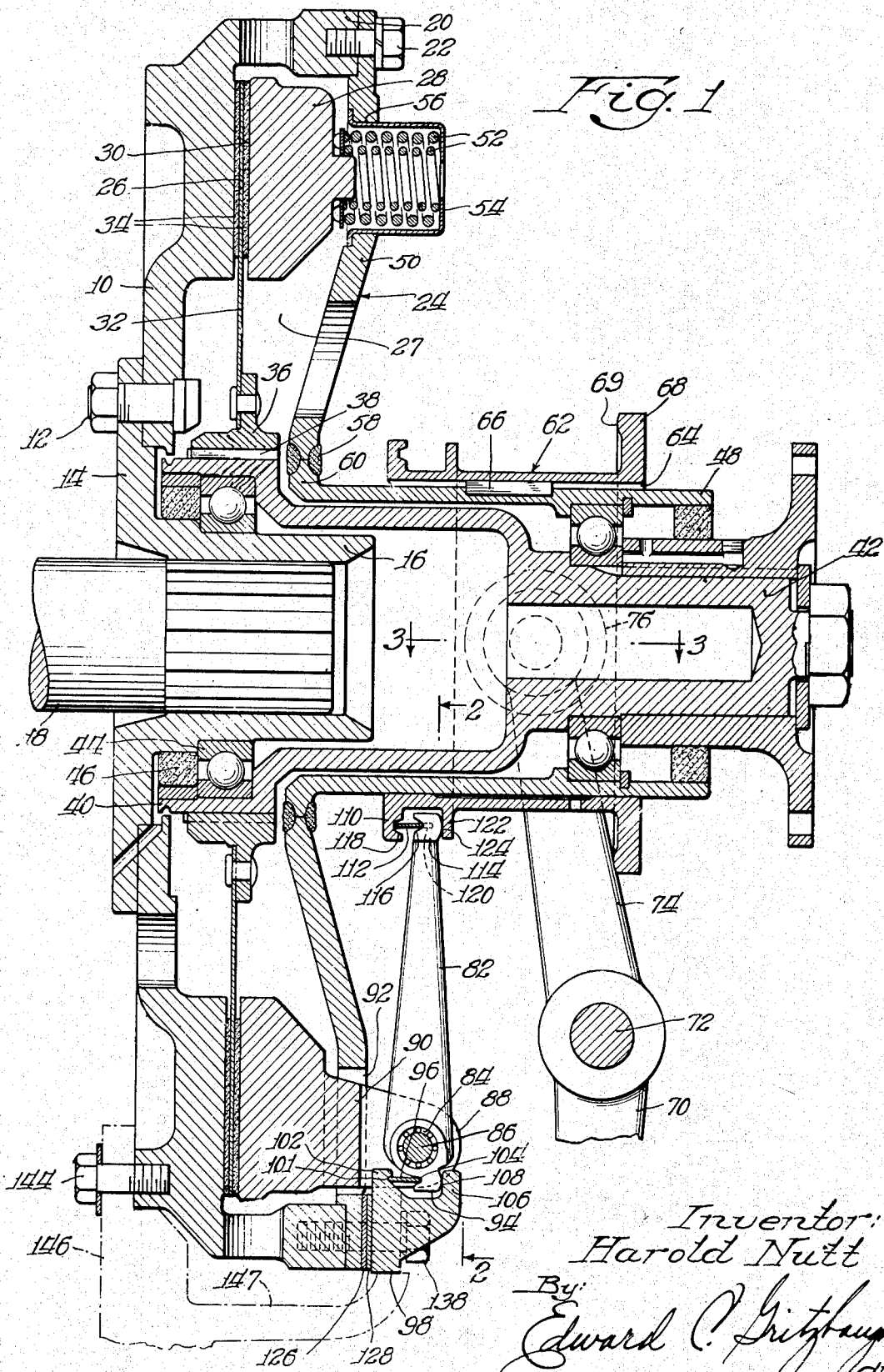
Fig. 1 is an axial sectional view of a clutch embodying my invention.

As an example of one form in which the invention may be embodied, I have shown in Figs. 1 to 5 inclusive a single plate clutch embodying a flywheel 10 bolted at 12 upon the flange 14 of a hub 16 which is internally splined for driving connection with the crank shaft 18. The flywheel 10 has at its periphery a rim 20 to the rear face of which is bolted at 22, the cover 24. The flywheel 10 is provided with a friction face 26. Defined between the cover 24 and the flywheel 10 is an annular chamber 27 in which is received the annular pressure plate 28 having a friction face 30 opposed to the friction face 26 of the flywheel.

A driven plate 32 is provided with friction facings 34 engageable between the friction faces 26 and 30. The driven plate 32 includes a hub portion 36 which is splined at 38 upon the hub portion 40 of the driven shaft 42. The driven shaft hub 40 is journalled upon the hub 16 of the flywheel by means of an anti-friction bearing 44. Lubricant is sealed within the hollow interior of the driven shaft 42 by a sealing ring 46 cooperating with the bearing 44.

The cover 24 includes a hub sleeve 48 and a radially extending disc portion 50. Clutch packing springs 52 are interposed between the pressure plate 28 and spring socket cups 54 which are set into openings 56 in the disc member.

The disc member 50 is made of quite thick material in order to adequately withstand without distortion the heavy loads developed in the clutch. It is made of pressed steel in order to adequately withstand centrifugal forces developed in it. Because of its thickness, however, it is impracticable to form it integrally with the hub sleeve 48 and accordingly, the disc 50 is formed as a separate annulus and is welded as at 58 to a flange 60, which is formed on one end of the sleeve 48.

Surrounding the sleeve 48 is the release collar 62 which has an internal keyway 64 receiving a key 66 mounted in the sleeve 48. Thus the collar 62 may slide axially while being held against rotation.

The rear end of the collar 62 is formed with a radial flange 68. An operating lever 70, pivoted at 72 to a portion of the frame of the vehicle has a pair of furcations 74 on the ends of which are journalled rollers 76. The rollers 76 are arranged to engage the flange 68 at diametrically opposed points, and are journalled, through the medium of bearings 78 on trunnions 80 mounted in the furcations 74.

In the earlier clutches of this type, considerable wear was encountered in the engaging surfaces of the rollers and the throw-out collar flange. I have concluded that this was due to the fact that the surface of the collar flange against which the rollers engaged was flat and made a line contact with the rollers, resulting in a wiping action between the rollers and the flange. Such wiping action would arise as a result of the difference in linear speed between the outer and inner regions of the flange surface in contact with the rollers, and the constant linear speed of all portions of the roller surface.

The present invention remedies this difficulty by crowning as at 69 the surface of the flange 68, which engages the rollers 76. As a result, the rollers 76 engage the flange 68 at only one radius, and wiping action is eliminated.

An alternative solution of the problem is to crown the surface of the rollers 76 as at 76a in Fig. 7, permitting the coacting surface of the flange 68a to be flat as shown. The effect is the same, i. e. the roller contacts the flange at only one radius of the latter, and wiping action is eliminated. If desired, both roller and flange may be crowned.

Clutch disengaging pressure is transmitted from the collar 62 to the pressure plate 28 through the medium of clutch operating levers 82. The levers 82 are pivoted through the medium of anti-friction bearings 84, on pins 86, which are each mounted in a pair of circumferentially spaced ears 88 formed on the pressure plate 28. Each pair of ears 88 is formed as the terminal portions of a driving lug 90, which extends through an opening 92 in the cover 24, and cooperates with the cover to transmit drive from the cover to the pressure plate. The levers 82 are positioned circumferentially by their confinement between the ears 88.

The outer end portion 94 of each lever 82 is fulcrumed against a strut 96 which in turn bears against a bracket 98 secured to the cover 24. The brackets 98 and the cover 24 are both secured to the rim 20 of the flywheel by the same bolts 138. Each strut 96 is engaged at one end in a depression 101 in a finger 102 on the bracket 98, and at its other end in a depression 104 in the outer end portion 94 of the lever 82. Thus the strut is confined against radial movement. The finger 102 extends between the ears 88. Thus the strut is confined between the ears 88 against circumferential movement.

The outer end portion 94 of the lever has a crowned rear surface 108 and is restrained against movement away from the finger 102 by a restraining finger 106 formed on the bracket 98 and extending into close proximity to the crowned surface 108. The crowning of the surface 108 maintains the region of contact between the finger 106 and the lever end 94 in substantially the same position on the finger 106. The finger 106, by preventing spreading movement between the finger 102 and the end portion 94 of the lever, eliminates any possibility of the strut 96 becoming displaced from the depressions 101 and 104.

Thrust is transmitted from the sleeve 62 to the inner ends of the levers 82 through the medium of a radial flange 110 on the forward end of the collar 62, and a strut 112 interposed between the flange 110 and each of the levers 82. The inner end 114 of each lever 82 is widened circumferentially and provided with a notch 116 in which one end of the strut 112 is cradled. The other end of the strut is received in an annular groove 118 in the rear face of the flange 110. The groove 118 is of sufficiently greater width radially than the thickness of the struts 112 to accommodate the chordal positioning of the struts therein.

Each strut 112 is positioned circumferentially by a pair of fingers 120 (see Fig. 8) on the strut embracing the adjacent region of the end portion 114 of the lever.

Undesired movement between the inner ends of the levers and the collar 62 is restrained by a restraining flange 122 on the collar 62, cooperating with crowned surfaces 124 on the inner end portions 114 of the levers. As at the outer ends of the levers, by thus preventing the levers and flange 110 from spreading apart, I eliminate any possibility of the struts 112 becoming displaced from the depression 116 or groove 118.

The struts 96 and 112 function to transmit thrust between the arcuately swinging end portions of the levers 82 and the collar 62 and bracket 98 respectively without the development of wiping action. The fingers 106 and flange 122 cooperate to maintain the parts in assembled relation and to prevent any substantial amount of lost motion in the linkage. The employment of struts makes it possible to successfully use lost motion restraining members which are rigidly associated with the throw-out collar and cover bracket respectively. Assembly of the parts is made possible by employing brackets 98 which are separate from the cover 24, and which may be secured thereto after assembly of the struts 96 and the outer ends 94 of the levers between fingers 102 and 106 has been effected. This operation is the last step in the assembling of the linkage, and is made possible by the provision of relatively wide shim spaces between the brackets 98 and the cover 24. In order to make these points clear I will now briefly describe the complete operation of assembling the linkage.

Having first assembled the driven plate 32 and pressure plate 28 loosely between the flywheel 10 and cover 24, with the packing springs 52 and retainer cup 54 in place, pressure is brought to bear against the cover 24 by a suitable arbor press or the like until the springs 52 have been compressed sufficiently to permit the cover to make contact with the rim 20 of the flywheel. During this step in the operation, the ears 88 are guided through the openings 92 in the cover. The levers 82 are then inserted between the ears 88 and the bearings 84 and pivot pins 86 are assembled. The inner ends of the levers are then moved away from the cover 24 until their arcs of swing bring them raidally outwardly of the outer diameter of the flange 110 of the collar 62. The collar 62 is then slipped over the cover hub sleeve 48 and advanced between the ends of the levers to a position in which the flange 110 has cleared the inner ends of the levers. The struts 112 are then assembled in the notches 116 in the ends of the levers, and the levers are swung toward the cover while the struts 112 are manipulated into the groove 118 in the collar flange 110. The collar 62 is then moved toward the cover and the ends 114 of the levers are manipulated into the annular space between the flanges 110 and 122, the struts 112 being meanwhile held against escape and permitted to tilt toward parallelism with the clutch axis until the assembly has proceeded to a point where they are confined against escape from their proper positions.

The throw-out collar is then moved as near to the cover as possible so as to provide a maximum space between the outer end 94 of each lever 82 and the cover. The brackets 98 and struts 96 are then applied, the struts and fingers 102 being first inserted between the ears 88 while the outer portions of the brackets are in direct contact with the cover, the brackets being then manipulated so as to slide the fingers 106 over the end portions 94 of the levers. During this manipulation the brackets will be moved away from the cover, leaving spaces which are filled by the shim mechanism now to be described.

Between each bracket 98 and cover 24 is included a plurality of shims 126 and 128 respectively. The shims 126 have holes 130 in their respective ends. The brackets 98 have ears 132 provided with correspondingly positioned openings. The shims 128 each have a hole 134 at one end and a notch 136 at the other end. Bolts 138 are extended through the ears 132, the holes 130, the holes 134, and notches 136, and threaded into the rim of the flywheel. The bolts 138 secure all parts of the clutch in assembled relationship.

I employ one of the shims 128 and one or more of the shims 126 under each bracket 98. The shims 126 are of varying thickness and are selected so as to line up the levers 82 in parallel relationship, i. e., with their inner ends uniformly related to the flanges 110 and 122 of the throw-out collar. The shims 128 have a uniform thickness which is determined by the amount of wear to be taken up in the clutch after a predetermined period of operation has expired. Each of the shims 128 has at one end a tab 140 provided with a screw driver slot 142. Adjustment for wear may be made quickly and easily by removing the bolts 138 which extend through the openings 134, loosening the remaining bolts 138, inserting the end of a screw driver in each slot 142, and sliding the shims 128 from beneath the brackets 98. The notches 136 permit the shims to be thus pulled out when the bolts are removed from the holes 134, while the shims 126 remain pinioned upon the remaining bolts. When the shims 128 are detached, the removed bolts are replaced and the cover assembly tightened down against the flywheel. This operation effects a takeup of the wear that has taken place in the clutch, without disturbing the parallelism of the levers which was initially effected by the insertion of the shims 126. Thus the clutch can be quickly and easily adjusted in the field without disturbing the proper operative positioning of its parts.

The dotted lines 146 and 147 indicate the hub portion of a fan employed for cooling the engine of a tank in which the clutch may be embodied.

The clutch shown in Fig. 6 involves all of the novel features pointed out above, differing from the previously described clutch in having two driven plates 32a and two pressure plates 28a and 28b respectively and a separate friction facing 34a bolted to the flywheel by bolts 148. The cover 24a is also changed, being in the form of a steel casting with the spring pockets 54a integrally formed therein. The bolts 138 in this form of the invention do not extend into the flywheel. The cover is secured to the flywheel by separate bolts 138a. Thus the brackets 98 are separately mounted on the cover and the cover, with the brackets attached, may be disassembled as a unit without disturbing the setting of the brackets. In all other respects this clutch is the same as the one previously described and the same reference characters are used to designate the parts thereof.

I claim:

1. In a heavy duty friction clutch, in combination with a pair of clutch members drivingly connected together and axially movable with reference to each other, a lever pivoted on one of said members and having an outer end portion fulcrumed with reference to the other of said members, the fulcrum means comprising a bracket on said other member having a pair of integral spaced elements one of which is in close juxtaposition to one side of said lever end portion, and a swinging fulcrum strut interposed between the other side of said lever end portion and the other of said elements.

2. A clutch as defined in claim 1, wherein said brackets are separate from said other member and spaced therefrom by shim means which when removed permits the brackets to be manipulated for assembly and disassembly with reference to said lever ends and struts.

3. A clutch as defined in claim 1, wherein said one member includes a pair of ears between which said lever is pivoted, said strut being positioned between said ears and thereby confined against cricumferential movement.

4. A clutch as defined in claim 1, wherein said one member includes a pair of ears between which said lever is pivoted, said lever end and said strut-engaging element having recesses in which the respective ends of said strut are received so as to confine said strut against radial movement, said recesses being located within the space between said ears so as to confine said strut between said ears against circumferential movement.

5. In a friction clutch, a flywheel and pressure plate adapted to engage a driven member between them, a cover on said flywheel defining therewith an annular space in which said pressure plate is received, said cover having an opening and said pressure plate having a driving lug extending through said opening, said lug terminating in a pair of circumferentially spaced ears, a release lever pivoted in said ears, a bracket detachably secured to said cover and flywheel, said bracket having a pair of integral radially inwardly extending axially spaced fingers, one of which extends into the space between said ears and is provided therein with a recess facing the outer end of said lever, said outer lever end having a recess facing said recessed finger and located in the space between said ears, a strut the respective ends of which are received in said recesses and thus confined against radial movement, said strut being confined between said ears against circumferential movement, the other of said fingers being in close proximity to the side of said end lever portion opposite the recessed side thereof and functioning to prevent spreading movement between said lever end portion and said recessed finger such as would permit the strut to become displaced from said recesses.

6. A clutch as defined in claim 5, wherein said bracket is detachably secured to said cover and spaced therefrom by spacing means which when removed permit the manipulation of said bracket into and out of assembled relationship with said strut and lever end.

7. In a friction clutch, a pair of clutch members adapted to engage a clutch element between them, one of said clutch members having a pair of circumferentially spaced ears, a lever pivoted between said ears and having a recess disposed between said ears, an element carried by the other of said members, extending between said ears and having a recess facing the recess in said lever, and a fulcrum strut, the respective ends of which are received in said recesses and thereby restrained against radial movement, said strut being confined between said ears against circumferential movement.

8. A clutch as defined in claim 7, including means for confining said lever against spreading movement with reference to said recessed element, such as would permit the strut to become displaced from said recesses.

9. In a friction clutch, a clutch member having a hub sleeve, a clutch operating collar axially slidably and non-rotatably mounted on said sleeve, said collar having a radial flange, a clutch lever having an inner end opposed to said flange, means on which said clutch lever is pivoted on an axis at a distance radially from the clutch axis, and a thrust transmitting strut interposed between said inner end of the lever and said flange, adapted to effect substantially non-frictional transmission of thrust from said collar to said lever.

10. A clutch as defined in claim 9, wherein said flange has an axially facing annular groove in which one extremity of said strut is confined against radial movement.

11. A clutch as defined in claim 9, in which said inner lever end has a notch in which one extremity of said strut is confined against radial movement.

12. A clutch as defined in claim 9, wherein said flange has an axially facing annular groove in which one end of said strut is confined against radial movement and said lever has an axially facing notch opposed to said groove, in which the other end of said strut is confined against radial movement.

13. A clutch as defined in claim 9, wherein said flange and inner end of the lever are provided with opposed depressions receiving the respective ends of the strut and positioning the same against radial movement and wherein said strut is provided with a pair of circumferentially spaced fingers embracing the lever so as to position said strut against circumferential movement.

14. A clutch as defined in claim 9, wherein said flanges and lever ends are provided with opposed recesses in which the respective ends of the struts are received and positioned against radial movement and in which said collar is provided with a second flange cooperating with the first mentioned flange to define an annular space in which said lever end and strut are confined against axial displacement with reference to said first mentioned flange.

15. A clutch as defined in claim 9, wherein said flange is provided with an axially facing annular groove in which one end of said strut is confined against radial movement, said inner end of the lever is provided with a notch in which the other end of said strut is confined against radial movement, said strut includes a pair of circumferentially spaced fingers embracing said lever so as to position said strut against circumferential movement, and said collar is provided with a second flange spaced from said first mentioned flange to provide an annular space in which said inner end of the lever and said strut are confined against axial displacement with reference to said first mentioned flange.

16. In a friction clutch, a pair of clutch members adapted to engage a clutch element or elements between them, a plurality of lever fulcrum brackets detachably secured to one of said members, a plurality of levers each pivoted to said other member and fulcrumed with reference to one of said brackets, means for transmitting thrust to the inner ends of said levers, and spacing means interposed between said brackets and said one member, said spacing means including a plurality of wear take-up shims of uniform thickness, one for each of the brackets, and a plurality of shims for effecting initial adjustment of the levers, said take-up shims being adapted to be removed while the adjustment shims remain, whereby to correct for wear in the clutch without disturbing the positional relationship of the levers and said thrust transmitting means.

17. A clutch as defined in claim 16, wherein said brackets are each provided with a pair of spaced openings, said initial adjustment shims are provided with a pair of correspondingly spaced openings and said take-up shims are each provided with an opening and a notch corresponding to the aforesaid openings.

18. A clutch as defined in claim 16, wherein said wear take-up shim is provided with a tab extending beyond an extremity of said bracket to facilitate the removal thereof from beneath the bracket.

19. In a friction clutch, a flywheel and pressure plate adapted to engage a driven member between them, a cover on said flywheel defining therewith an annular space in which said pressure plate is received, said cover having an opening and said pressure plate having a projecting portion extending through said opening, a release lever pivoted on said projecting portion, a bracket against which the outer end of said lever is fulcrumed, said bracket being detachably secured to said cover by means not directly connected with the flywheel, and separate means attaching said cover to the flywheel.

20. In a friction clutch, a flywheel and pressure plate adapted to engage a driven member between them, a cover on said flywheel defining therewith an annular space in which said pressure plate is received, said cover having an opening, said pressure plate having a projecting portion extending through said opening, a plurality of fulcrum brackets secured to said cover by means not directly connected with said flywheel, separate means connecting said cover to said flywheel, levers pivoted on said projecting portion and fulcrumed against said brackets, and spacing means interposed between said brackets and said cover, said spacing means including a plurality of wear take-up shims and a plurality of shims for effecting initial adjustment of the levers.

HAROLD NUTT.